United States Patent
Yu et al.

(10) Patent No.: US 8,478,700 B2
(45) Date of Patent: Jul. 2, 2013

(54) OPPORTUNITY IDENTIFICATION AND FORECASTING FOR SEARCH ENGINE OPTIMIZATION

(75) Inventors: Jimmy Yu, Foster City, CA (US);
Sammy Yu, San Mateo, CA (US);
Lemuel S. Park, Cerritos, CA (US);
Rolland Yip, Foster City, CA (US)

(73) Assignee: Brightedge Technologies, Inc., San Mateo, CA (US)

( * ) Notice: Subject to any disclaimer, the term of this patent is extended or adjusted under 35 U.S.C. 154(b) by 335 days.

(21) Appl. No.: 12/854,644

(22) Filed: Aug. 11, 2010

(65) Prior Publication Data
US 2012/0041918 A1 Feb. 16, 2012

(51) Int. Cl.
*G06F 15/18* (2006.01)

(52) U.S. Cl.
USPC .......................................... 706/12; 705/14.43

(58) Field of Classification Search
USPC ................................. 706/12; 705/14.43, 14.46
See application file for complete search history.

(56) References Cited

U.S. PATENT DOCUMENTS

| | | | |
|---|---|---|---|
| 2006/0122991 A1 | 6/2006 | Chandrasekar et al. | |
| 2007/0100824 A1 | 5/2007 | Richardson et al. | |
| 2007/0130004 A1* | 6/2007 | Borgs et al. | 705/14 |
| 2007/0150344 A1* | 6/2007 | Sobotka et al. | 705/14 |
| 2010/0153391 A1* | 6/2010 | Reese | 707/736 |
| 2010/0241510 A1* | 9/2010 | Zhang | 705/14.45 |
| 2010/0274665 A1* | 10/2010 | Shkedi | 705/14.46 |
| 2011/0035276 A1* | 2/2011 | Ghosh et al. | 705/14.46 |
| 2011/0191168 A1* | 8/2011 | Schroedl et al. | 705/14.45 |
| 2012/0030012 A1* | 2/2012 | Fisher | 705/14.46 |

FOREIGN PATENT DOCUMENTS

| WO | 2005/055015 A2 | 6/2005 |
|---|---|---|
| WO | 2009/134522 A1 | 11/2009 |

OTHER PUBLICATIONS

B. Xing and Z. Lin, "The Impact of search engine optimization on online advertising market", Proc. Intl Conf. on Electronic Commerce, 2006, pp. 519-29.*
V. V Abhishek and K. Hosanagar, "Keword generation for search engine advertising using semantic similarity between items", Proc. Intl Conf. on Electronic Commerce, 2007, pp. 89-94.*
A. King, Website Optimization, Ch. 1, 2008, pp. 5-7.*
P. P Rusmevichientong and D. Williamson, "An Adaptive Algorithm for Selecting Profitable Keywords for Search-Based Advertising Services", ACM EC'06, Jun. 2006, pp. 260-269.*
International Search Report dated Mar. 20, 2012 as received in application No. PCT/US2011/047297.
Written Opinion of the International Searching Authority Mar. 20, 2012 as received in application No. PCT/US2011/047297.

* cited by examiner

*Primary Examiner* — Kakali Chaki
*Assistant Examiner* — Vincent Gonzales
(74) *Attorney, Agent, or Firm* — Maschoff Brennan

(57) ABSTRACT

A method of optimizing placement of references to an entity includes identifying at least search term to be optimized, determining a score for results of a search of a network with respect to the entity, determining costs associated with improving the score, and determining values associated with improving the score.

15 Claims, 5 Drawing Sheets

| Keywords | Avg. Rank | Visits | Conversions | Conversion Rate | Total Value |
|---|---|---|---|---|---|
| worth of my website | 15.00 | 4 | 2 | 50.0% | $20.00 |
| valuate my site | 16.00 | 16 | 3 | 18.8% | $30.00 |
| web site worth | 16.14 | 32 | 6 | 18.8% | $60.00 |
| my website worth | 16.21 | 10 | 6 | 60.0% | $60.00 |
| web site value | 18.07 | 29 | 10 | 34.5% | $100.00 |
| how much is my site worth | 18.43 | 27 | 9 | 33.3% | $90.00 |
| what is my website worth | 22.79 | 12 | 1 | 8.3% | $10.00 |
| website value | 23.79 | 467 | 132 | 28.3% | $1,320.00 |
| value of website | 25.29 | 63 | 21 | 33.3% | $210.00 |
| website worth | 27.29 | 491 | 149 | 30.3% | $1,490.00 |
| www.bbastudents.com | 30.07 | 2 | 0 | 0.0% | $0.00 |
| chainwiregames | 31.21 | 3 | 0 | 0.0% | $0.00 |
| worth of website | 43.14 | 4 | 3 | 75.0% | $30.00 |
| value website | 57.07 | 5 | 2 | 40.0% | $20.00 |
| website value calculator | 83.57 | 9 | 2 | 22.2% | $20.00 |
| how much does my site value | NA | 1 | 0 | 0.0% | $0.00 |
| how much does my site worth | NA | 1 | 0 | 0.0% | $0.00 |
| how much are websites worth | NA | 5 | 1 | 20.0% | $10.00 |
| how much does my website worth | NA | 2 | 0 | 0.0% | $0.00 |
| how much a website worth it | NA | 1 | 1 | 100.0% | $10.00 |
| how can I value my website | NA | 1 | 1 | 100.0% | $10.00 |
| how much a website is worth | NA | 4 | 1 | 25.0% | $10.00 |
| how much fiverr.com is worth? | NA | 1 | 0 | 0.0% | $0.00 |
| how much are egms worth | NA | 1 | 0 | 0.0% | $0.00 |
| how much is a limusina | NA | 1 | 0 | 0.0% | $0.00 |

FIG. 4

OPPORTUNITY IDENTIFICATION AND FORECASTING FOR SEARCH ENGINE OPTIMIZATION

BACKGROUND OF THE INVENTION

The Field of the Invention

The Internet has changed the way people gather information, establish relationships with one another and even how people communicate with one another. Additionally, the Internet has changed the way companies seek potential customers and even what the meaning of a business is. It has changed the way companies advertise, sell, coordinate with one another and compete with one another. With this change has come a huge explosion in the number of Web Pages for people to visit. Search engines, such as Google, Bing, Yahoo and others have come into being to help people find their way to Web Pages that they desire. As a result, the number and types of channels that a marketer can leverage has also exploded—beyond organic and paid search, they can also leverage blogs, social media, video sharing, mobile content and ads, display ads, and many other channels.

Additionally, tracking the behavior of the actions of each visitor would allow the Web Page to be marketed more efficiently. In particular, many Web Pages track their organic search performance in search engines based on number of visits for certain keywords. However, they cannot determine how many visitors came as a result of a particular search engine result and rank position to the Web Page, instead they must estimate this based on the data (referral header) passed to the web page which only helps them determine the number of visitors that came from a specific keyword. Without understanding key attributes of their performance on the search engine, they cannot accurately determine the effectiveness of their marketing efforts. Moreover, they cannot determine how their organic search marketing efforts would impact what those visitors do on the Web Page when they have found the Web Page. For example, if a Web Page is selling merchandise, there is currently no way to determine who completed a particular purchase on the Web Page and compare that with how that visitor came to the Web Page.

Therefore, owners and designers of Web Pages must estimate how visitors have come to the Web Page and what they do once they are on the Web Page. This does not allow them to determine which actions would present a better chance for success of the Web Page. For example, a Web Page owner might be confronted with limited marketing budgets that allow them to either improve their ranking in search engine results or that will place advertisements for their Web Page on other Web Pages but not both. Currently, the Web Page owner must choose which strategy to follow with limited information on which would be more effective.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A method of optimizing placement of references to an entity may include identifying at least search term to be optimized, determining a score for results of a search of a network with respect to the entity, determining costs associated with improving the score, and determining values associated with improving the score.

In another example, method for optimizing online references to an entity may include searching at least one channel on a network for references to the entity using a plurality of search terms to generate search results. The references associated with each of the plurality of search terms may be scored to generate scores for the references within the search results with respect to the entity. Conversions by one or more visits the entity with the search terms that directed the visits to the entity to determine a conversion rate may also be correlated. The method may also include determining a total value of the visits to the entity and displaying the search terms, the scores for the references within the search results with respect to the entity, the visits, the conversion rate and the total value.

In yet another example, a system for optimizing online references to an entity may include a correlator configured to determine internal data for search terms associated with the references, a deep index engine configured to generate scores for the references within the search results with respect to the entity, and a forecasting engine configured to correlate internal data with the scores for the references.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 3 and 4 illustrate an exemplary method for identifying opportunities;

DETAILED DESCRIPTION OF THE PREFERRED EMBODIMENTS

Systems and methods are provided herein for combining data from internal sources (e.g. internal web analytics data, web server logs, and the like) with third party data (e.g., search engine data provided by search engines such as the CPC value of a keyword, the search frequency of a keyword) and external data (e.g., data crawled on external web pages). Using the combined data, the system may mine for trends and/or conduct automated analysis to surface opportunities (e.g., finds keywords that are spiking in search volume, that the customer does not rank on and has a good opportunity to rank on because the competition is weak).

Systems and method are also provided to identify trends from internal/third party/external data in order to see where opportunities are (e.g., what are keywords that are spiking in search volume, what are keywords that my competition does not rank on, how are users changing their search behavior).

Alternatively or additionally, systems and methods may be provided herein to assign values to the data (e.g., what is the value of a keyword) based on automated value algorithms, values as some form of custom formula defined by user, apply probabilistic modeling to the data for the purpose of forecasting.

Figure 1:
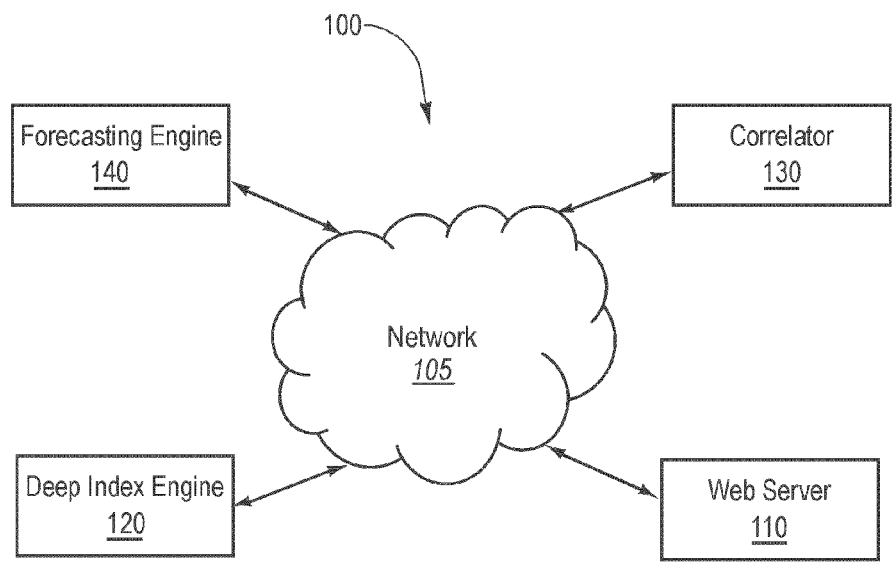
FIG. 1 illustrates a block diagram of a system for optimizing placement of references to an entity.

FIG. 1 illustrates a block diagram of a system 100 for optimizing placement of references to an entity within one or more channels. Entities can include individuals, corporations, brands, products, models or any other entities referenced anywhere on a network such as the Internet. The references may include links and/or references to one or more Web Pages or other media, such as display advertisements, associated with the entity. Accordingly, the references can include organic references, online advertisements including display advertisements, news items or any other reference to the entity.

FIG. 1 shows that the system 100 can include a network 105. In at least one implementation, the network 105 can be used to connect the various parts of the system 100 to one another, such as between a webserver 110, a deep index engine 120, a correlator 130, and a forecasting engine 140. It will be appreciated that while these components are being shown as separate, the components may be combined as desired. Further, while one of each component is illustrated, it will be appreciated that the system 100 may include any number of each of the components shown.

As will be discussed in more detail hereinafter, the forecasting engine 140 is configured to determine a search term or search terms to optimize. The search term or terms may be selected from a group or basket of known search terms that may affect actions related to the entity. The forecasting engine 140 may also be configured to help marketers forecast the business value of optimization initiatives (e.g., if I work on optimizing for a given 5 keywords, what is the likely result of improvement in my search engine rank position and how much more incremental revenue will be generated from the improvement) and also take into account the difficulty and expense associated with the initiative.

In at least one example, the network 105 includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 105 includes one or more cellular RF networks and/or one or more wired and/or wireless networks such as, but not limited to, 802.xx networks, Bluetooth access points, wireless access points, IP-based networks, or the like. The network 105 can also include servers that enable one type of network to interface with another type of network.

In at least one implementation, the web server 110 (or "webserver") can include any system capable of storing and transmitting a Web Page to a user. For example, the web server 110 can include a computer program that is responsible for accepting requests from clients (user agents such as web browsers), and serving them HTTP responses along with optional data contents, which can include HTML documents and linked objects for display to the user. Additionally or alternatively, the web server 110 can include the capability of logging some detailed information, about client requests and server responses, to log files.

The entity can include any number of Web Pages. The aggregation of references to the various Web Pages can be referred to as traffic. It should be noted that "Web Page" as used herein refers to any online posting, including domains, subdomains, Web posts, Uniform Resource Identifiers ("URIs"), Uniform Resource Locators ("URLs"), images, videos, or other piece of content and non-permanent postings such as e-mail and chat unless otherwise specified.

In at least one implementation, external references to a Web Page can include any reference to the Web Page which directs a visitor to the Web Page. For example, an external reference can include text documents, such as blogs, news items, customer reviews, e-mails or any other text document which discusses the Web Page. Additionally or alternatively, an external reference can include a Web Page which includes a link to the Web Page. For example, an external reference can include other Web Pages, search engine results pages, advertisements or the like.

In the illustrated example, the deep index engine 120 is configured to use search terms identified above to perform a search of the network to identify references to the entity. The deep index engine 120 is further configured to score the results of the search of the network with respect to the entity. This score may include a position at which references to the entity are displayed within the search results. The relative position of the references to the entity within the search result can affect how the references affect actions related to the entity. Accordingly, by determining the relative position of the references within search results, the deep index engine 120 is able to determine a current performance metric for each of the search terms as they relate to the entity.

Additionally or alternatively, the deep index engine 120 may be configured to score the search results for each of the search terms with respect to other entities, including entities found in the competitive listing for the search results. Accordingly, the deep index engine 120 may be configured to gather external data related to performance of other entities to establish current baselines for those entities as well.

Additionally or alternatively, the deep index engine 120 may be further configured to crawl the search results related to each of the search terms to retrieve external data. In particular, the deep index engine may be configured to crawl the search results for each of the search terms and analyze data associated with the crawl, including on-page information and back link data (e.g back link URL, anchor text, etc) for each URL in the search result. The deep index engine 120 may then analyze the data to identify additional search terms that may be relevant to the entity, but which may not have been searched or on which the entity does not rank. In at least one example, this analysis may include conducting a keyword frequency search. Accordingly, the deep index engine 120 may be configured to surface additional search terms. In at least one example, these additional search terms and opportunities identified and targeted in any channel (SEO, paid search, social networks, etc.) Cross-channel opportunities are also a part of the opportunity identification (e.g. if a customer is not ranking on a keyword on organic search that a competitor ranks on, the customer can immediately target this keyword in paid search.)

An exemplary deep index engine is described in more detail in copending U.S. patent application Ser. No. 12/436,704 entitled "COLLECTING AND SCORING ONLINE REFERENCES" filed May 6, 2009, the disclosure of which is hereby incorporated by reference in its entirety.

Additional current performance metrics may include internal data determined by the correlator 130. In at least one implementation, the correlator 130 can determine how visitors are directed to the entity and how those visitors behave once there. For example, the correlator 130 can correlate conversion of visits to the search terms that drove the visits.

An exemplary correlator is described in more detail in co-pending U.S. patent application Ser. No. 12/574,069 filed Oct. 6, 2009 and entitled "CORRELATING WEB PAGE VISITS AND CONVERSIONS WITH EXTERNAL REFERENCES" the disclosure of which is hereby incorporated by reference in its entirety.

As will be discussed in more detail hereinafter, the forecasting engine 140 may receive data from third parties including information about network activity related to the search terms described above. The forecasting engine 140 may also be configured to receive the internal data, including the output of the correlator 130 as well as external data, including the output of the deep index engine 120. The forecasting engine 140 may use the internal data, the third party data, and the external data to identify opportunities for optimizing placement of references to the entity as well as to forecasting the likely costs and benefits of improving references to the entity.

Figure 2:
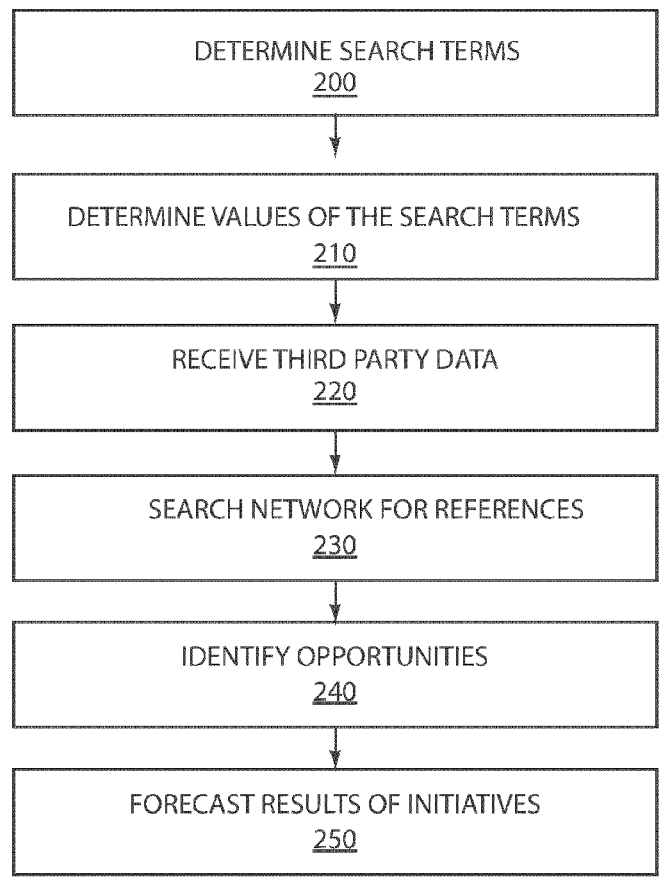
FIG. 2 illustrates a flowchart of an exemplary method of optimizing placement of references to an entity.

FIG. 2 illustrates a flowchart of an exemplary method of optimizing placement of references to an entity. The method can be implemented using software, hardware or any combination thereof. If the method is implemented using hardware, the steps of the method can be stored in a computer-readable medium, to be accessed as needed to perform their functions. Additionally, if the method is implemented using software, the steps can be carried out by a processor, field-programmable gate array (FPGA) or any other logic device capable of carrying out software instructions or other logic functions.

Additionally or alternatively, the method can be implemented using a server or other single computing environment. If a server or other single computing environment is utilized, the conversions need not be divided into groups, since all conversions will be analyzed by the same server or single computing environment.

FIG. 2 illustrates a method of optimizing placement of references to an entity within one or more channels. As illustrated in FIG. 2, the method begins at step 200 by determining search terms. In at least one example, search terms may include keywords retrieved from a keyword database. The keyword database contains one or more keywords to be used in the page search. In some embodiments, additional search terms may be surfaced by crawling previous search results, as introduced above.

At step 210, internal data is retrieved related to the search terms. For example, previous actions related to the network to determine a total number of conversions associated with the search terms as well as the total value of those conversions. This internal data may be retrieved or calculated in any desired manner.

The method also includes at step 220 receiving third party data related to the search terms. This third party data may include any desired information, including information about network activity related to the search terms. For example, third party data may include, without limitation, search engine data such as cost per click (CPC) values for the search terms, search frequency for the keywords, and any other desired data that may be provided by third parties. Requests for and/or receipt of third party data may take place at any point, including simultaneous retrieving internal data related to the search terms at step 210.

Still referring to FIG. 2, the method also includes at step 230 performing a search in which the search terms are used to search the network for references to the entity. Any method may be used to search the network for references to the entity. Further, any number of channels within the network may be searched as desired. In at least one example, performing the search may include scoring the results of the search of the network with respect to the entity. This score may include a position at which references to the entity are displayed within the search results.

Performing the search may also include performing a crawl of the search results related to each of the search terms. In particular, the method may include crawling the search results for each of the search terms and analyzing data associated with the crawl, including on-page information and back link data (e.g. back link URL, anchor text, etc) for each URL in the search result.

At step 240, the results of one or more of steps 200-210 may then be analyzed to identify opportunities and to forecast results of initiatives at step 250. An exemplary method for identifying opportunities will be discussed with reference to FIGS. 3 and 4 and an exemplary method for forecasting will be discussed with reference to FIGS. 5 and 6.

Figure 3:
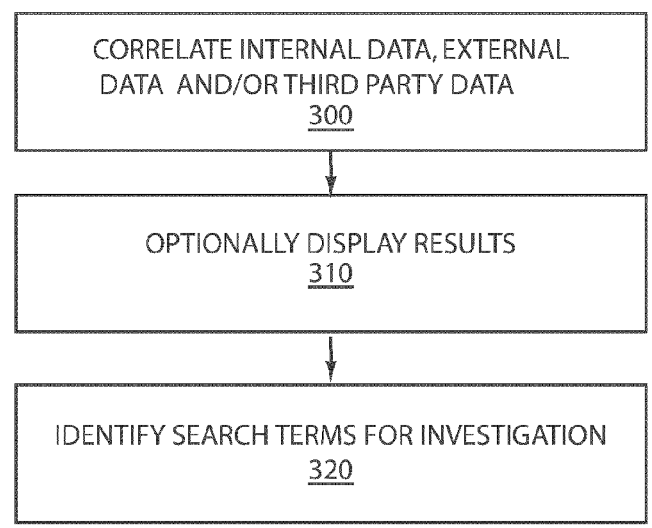

As illustrated in FIG. 3, a method for identifying opportunities to optimize references may begin by correlating internal data and external data. Optionally, third party data may also be included in the correlation. In at least one example correlating internal and external data includes correlating scores for each of the search terms with respect to references to the entity, the total number of visits related to the network associated with each search term, the number of conversions associated with those visits, the ratio of conversions to visits, and the total value of the conversions associated with the search terms.

Correlating these variables may bring into focus he search terms score with respect to the entity and how that score eventually results in value to the entity. Accordingly, at step 310 the method may include displaying search results to a user. An example of such a display is illustrated in FIG. 4.

Referring again to FIG. 3, once the internal and external data have been correlated, search terms may be identified for investigation as at step 320. Identifying search terms for investigation may include identifying search terms for which the references score poorly with respect to the entity. Such an example may include which scores place the references on a second page or worse on search results.

Conversion rates and/or total values may then be analyzed to determine whether the search terms are worth investigating. For example, if the search terms have a high conversion rate, it may be worth investigating improving the score for those search terms with respect to the entity. Further, if the total value associated with search term is relatively large despite a poor score, this may indicate that improving the score of the search term may be worth investigating. Accordingly, a method for identifying search terms for investigation may include determining a score threshold, such as a page rank score, determining a threshold conversion ratio and determining a threshold total value. If the parameters associated with a score are met and either or both of the conversion threshold or value threshold are met, the search term may automatically be identified for investigation.

Additionally or alternatively, the external data described above may be analyzed to score search results for references to another entity, such as a competitor. The scores associated with the search terms may then be analyzed to determine where another competitor may be weak. For example, if a competitor ranks low on a search term that has significant traffic or visits associated therewith as reflected in the third party data, that search term may be identified for further investigation.

Additionally or alternatively, the external data analyzed to score search results for references to another may indicate where the entity is weak. For example, additional search may be identified by crawling search results for a given set of search terms, as described above. The additional search terms may then be searched and a score generated for the search results with respect to both the entity and to competitors. If the scores indicate that the competitors score well with respect to those search terms and the entity does not, that determination may indicate the search terms are worth investigating, such as by targeting the search terms in paid searches. In at least one example, a threshold rank may be determined for the entity, such as a rank that indicates that references to the entity are appearing on a third page or worse. Any threshold rank may be used as desired. In such an example, if a competitor scores better than the threshold rank with respect to the search terms and the entity scores worse than the threshold rank, the search terms may be automatically target for a paid search.

Additionally or alternatively, third party data may indicate that activity related to certain search parameters has spiked. This spike itself may identify the search terms as being worth investigating.

Figure 5:
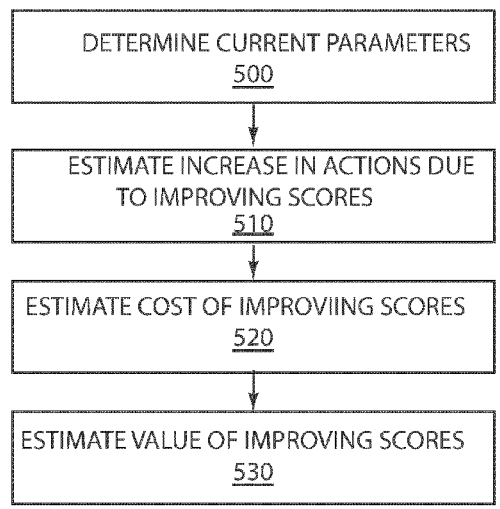
FIGS. 5 and 6 illustrate an exemplary method for forecasting results an initiative.

FIG. 5 illustrates a method for forecasting results of an initiative according to one example. The search terms may be generated by a user, may be surfaced according to the method for identifying opportunities described above, or by some other method. As a preliminary step, the search terms or other variables associated with the initiative may be analyzed as described with reference to FIGS. 2-3. Thereafter, as illustrated in FIG. 5, the method may begin by determining the current parameters associated with the search terms for actions related to the entity. These parameters may include the internal and external data, such as correlated scores for each of the search terms with respect to references to the entity, the total number of visits related to the network associated with each search term, the number of conversions associated with those visits, the ratio of conversions to visits, and the total value of the conversions associated with the search terms. These parameters may also include third party data.

Once the current parameters for the search terms are determined, at step 510 the method estimates the increase in actions associated with improving the scores for the search terms with respect to the entity. These estimates may be made a probabilistic model using data obtained from any of the sources described above. For example, it may be understood that keywords at given positions receive a relatively predictable percentage of the network traffic or visits for that page.

At step 520, the method continues with determining a cost for improving scores. For example, improving scores may include building back links to the entity. Determining a cost of improving scores may include tracking previous increases of back links and correlating previous improvements in rank. A historical regression analysis or other methodology may then be applied to the previous efforts to estimate a cost for improving scores based on the cost and time associated with activities that improve the score.

At step 530, the method continues with determining a value for improving scores using any desired calculation, such as user-defined formulas, probabilistic modeling or any other method. Accordingly, the present method allows marketers or other users to forecast likely outcomes for initiatives.

Figure 6:
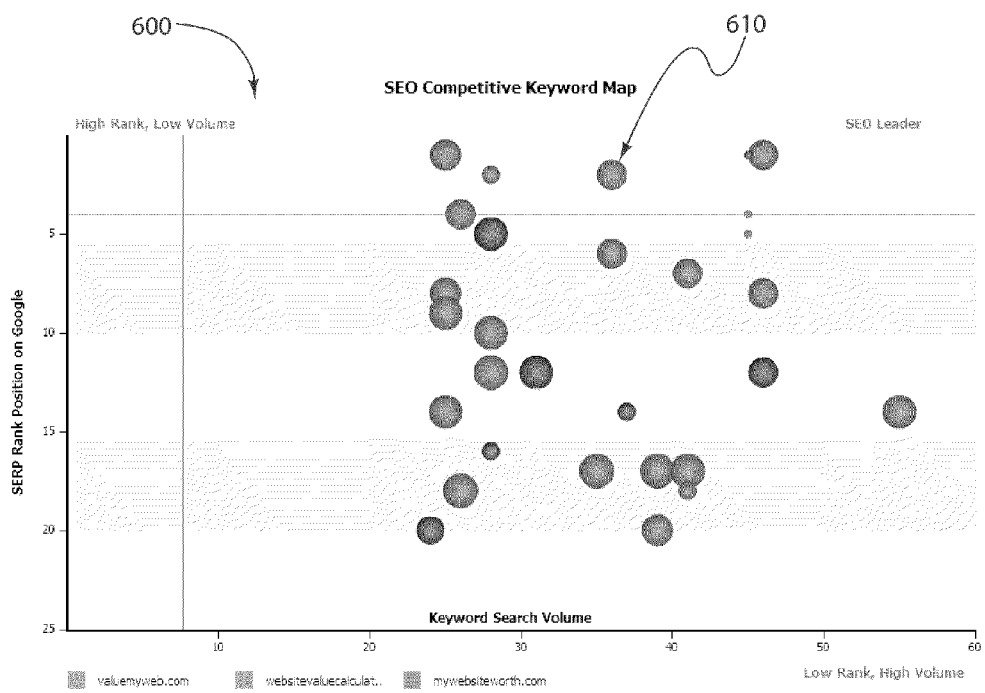

FIG. 6 illustrates a chart 600 that may be generated aid marketers in determining values of search terms. As illustrated in FIG. 6, the chart may plot rank position on a search engine against keyword search volume. A number of "bubbles" 610 represent various search terms. Each bubble 610 may represent a search term or group of search terms. The bubbles may also be color coded as desired to indentify which entity is referenced. Diameters of the bubbles may represent conversion rates or other desired variables for the search terms.

Figure 7:
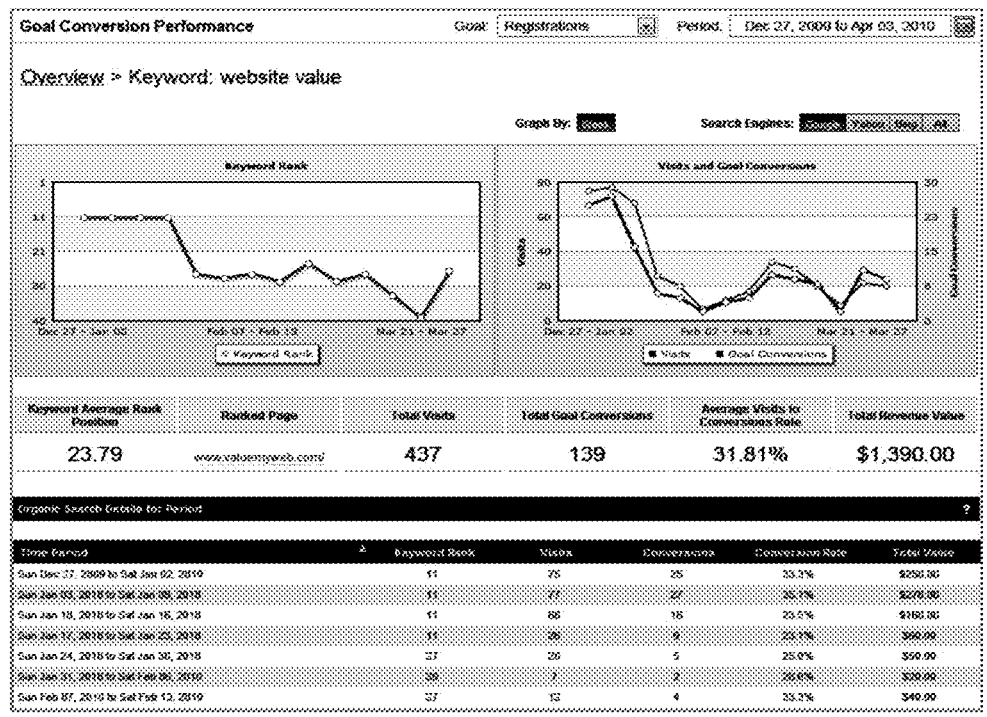
FIG. 7 illustrates a chart for tracking results of an initiative.

FIG. 7 illustrates a chart showing how selected parameters may be tracked over time, including those described above. Such chart can provide a useful tool in tracking the progress of initiatives, such as those described above.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for optimizing online references to an entity that are non-paid advertisements, the method comprising:

searching at least one channel unassociated with paid advertisements on a network for references to the entity unassociated with paid advertisements using a plurality of search terms to generate search results that include a plurality of references;

scoring the references to the entity associated with each of the plurality of search terms from the plurality of references to generate scores for the references to the entity;

correlating conversions by one or more visits to a website of the entity through the reference with the search terms that directed the visits to the entity to determine a conversion rate;

determining a total value of the conversions to the entity;

correlating at least the total value of the conversions to the entity associated with the references to the entity and the scores for the references to the entity to identify one or more of the plurality of search terms; and for the identified one or more of the plurality of search terms, forecasting an increase in conversions for the references to the entity associated with an increase in the scores for the references to the entity.

2. The method of claim 1, wherein searching the at least one channel includes searching at least one of: organic searches, page searches, e-mail, blogs, social networks, social news, affiliate marketing, discussion forums, news sites, rich media, and social bookmarks.

3. The method of claim 1, wherein using a plurality of search terms to generate search results includes using a plurality of keywords.

4. The method of claim 3, wherein using a plurality of keywords further includes crawling previously returned search results and conducting a keyword frequency analysis to identify at least some of the plurality of keywords.

5. The method of claim 1, wherein scoring the references to the entity associated with each of the plurality of search terms includes determining a keyword rank.

6. The method of claim 1, further comprising scoring references unassociated with the entity and associated with each of the plurality of search terms to generate scores for the references unassociated with the entity within the search results with respect to competitive listings;

comparing the scores of the references to the entity with the scores for the references unassociated with the entity with respect to competitive listings; and displaying the search terms, the competitive listings, and the scores for the references unassociated with the entity with respect to the competitive listings.

7. The method of claim 1, further comprising determining costs for improving the scores of the references to the entity.

8. The method of claim 7, further comprising determining values for improving the scores of the references to the entity associated with the search terms and selecting references to be improved based on determining the costs and values for improving the scores of the references to the entity associated with the search terms.

9. The method of claim 8, further comprising optimizing the scores of the references to the entity based on the steps of determining the costs and values for improving the scores of the references associated with the search terms.

10. The method of claim 1, further comprising:

crawling the plurality of search results to determine additional search terms;

searching the at least one channel unassociated with paid advertisements on the network using the additional search terms to generate additional search results;

determining scores for references to the entity and for references to an additional entity included in the additional search results;

analyzing the scores for the references to the entity and for the references to the additional entity to determine if the entity ranks with respect to the additional search terms and if the additional entity ranks with respect to the additional search terms; and automatically targeting the search terms in a paid search if the additional entity ranks above a first threshold score and the entity ranks below a second threshold score.

11. A non-transitory computer readable storage medium configured to cause a system to perform operations of optimizing online references to an entity that are non-paid advertisements, the operations comprising:

searching at least one channel unassociated with paid advertisements on a network for references to the entity unassociated with paid advertisements using a plurality of search terms to generate search results that include a plurality of references;

scoring the references to the entity associated with each of the plurality of search terms from the plurality of references to generate scores for the references to the entity;

correlating conversions by one or more visits to a website of the entity through the reference with the search terms that directed the visits to the entity to determine a conversion rate;

determining a total value of the conversions to the entity;

correlating at least the total value of the conversions to the entity associated with the references to the entity and the scores for the references to the entity to identify one or more of the plurality of search terms; and for the identified one or more of the plurality of search terms, forecasting an increase in conversions for the references to the entity associated with an increase in the scores for the references to the entity.

12. The non-transitory computer readable storage medium of claim 11, wherein the operations further comprise scoring the references to the entity associated with each of the plurality of search terms includes determining a keyword rank.

13. The non-transitory computer readable storage medium of claim 11, wherein the operations further comprise:

scoring references unassociated with the entity and associated with each of the plurality of search terms to generate scores for the references unassociated with the entity within the search results with respect to competitive listings;

comparing the scores of the references to the entity with the scores for the references unassociated with the entity with respect to competitive listings; and displaying the search terms, the competitive listings, and the scores for the references unassociated with the entity with respect to the competitive listings.

14. The non-transitory computer readable storage medium of claim 11, wherein the operations further comprise determining costs for improving the scores of the references to the entity.

15. The non-transitory computer readable storage medium of claim 14, wherein the operations further comprise determining values for improving the scores of the references to the entity associated with the search terms and selecting references to be improved based on determining the costs and values for improving the scores of the references to the entity associated with the search terms.

* * * * *